Sept. 23, 1969    H. B. VAN DORN    3,469,063
PROJECTION WELDING OF BEARING MOUNTS
Filed May 29, 1967
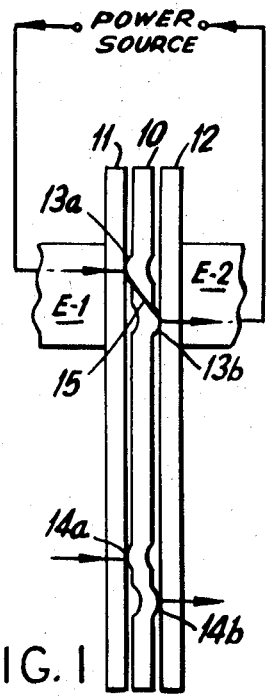
FIG.1
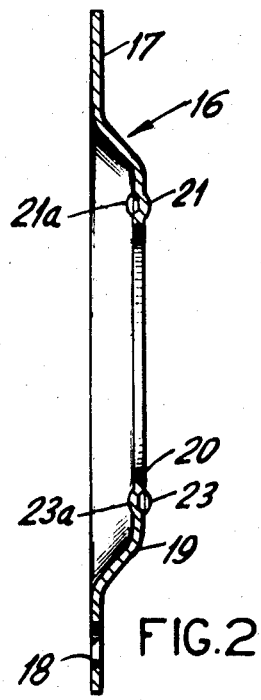
FIG.2
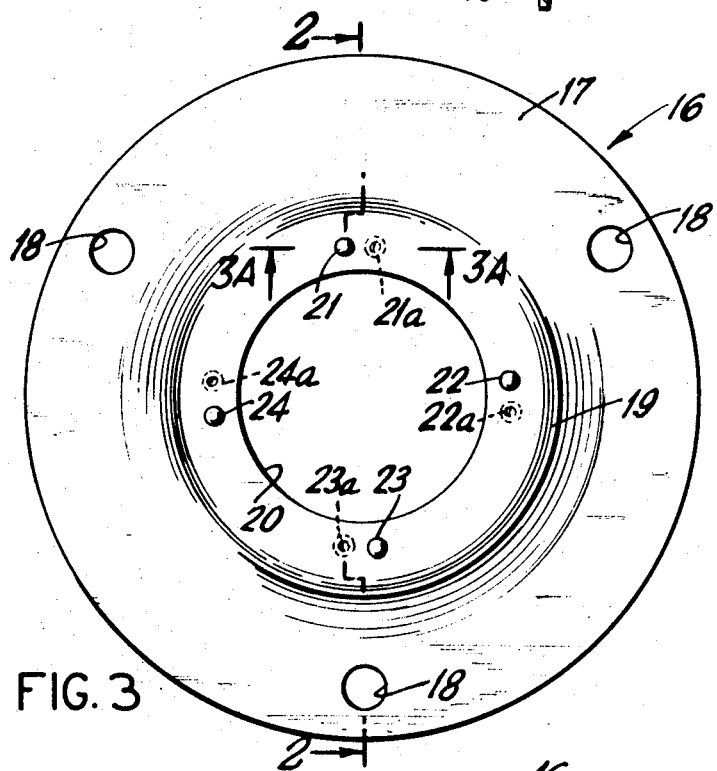
FIG.3
FIG.3A
FIG. 4
INVENTOR.
HORACE B. VAN DORN
BY
Hopgood & Calimafde
ATTORNEYS.

United States Patent Office 3,469,063
Patented Sept. 23, 1969

3,469,063
PROJECTION WELDING OF BEARING MOUNTS
Horace B. Van Dorn, Kensington, Conn., assignor, by mesne assignments, to Textron Inc., Providence, R.I., a corporation of Delaware
Filed May 29, 1967, Ser. No. 641,994
Int. Cl. B23k 11/10
U.S. Cl. 219—93                                    1 Claim

ABSTRACT OF THE DISCLOSURE

A method is disclosed for producing a projection welded metal laminate comprising at least three metal layers wherein the outside layers are projection welded to an intermediate layer. The intermediate layer is provided with a plurality of pairs of offset projections such that one projection of each pair is on one face of the intermediate layer and the other projection of the pair is on the other face but offset from the first projection. By positioning the intermediate layer in faying relationship between the two outside layers, the layers can be welded together by contact through said projections. The foregoing is particularly applicable in welding a bearing assembly to a bearing mounting bracket.

---

This invention relates to the projection welding of metal laminates and, in particular, to the spot welding of bearing mounts, for example, a mounting bracket having an opening centrally located therein whereby an antifriction bearing assembly is mounted and confined within a pair of dished annular members, the dished members being spot welded about their respective peripheries to each side of the mounting bracket.

In spot welding metal laminates together, generally the metal parts are assembled one against the other and spot welding electrodes brought to bear against the assembly with one electrode on one side and the other coaxially on the other side. When the two electrodes are brought in contact with the assembly, a heavy current is passed through the cross section of the laminate, whereby to heat the metal locally throughout the cross section and cause the layers of metal to weld together. In order to insure a good weld, the metal parts should be flat at their contacting portions to avoid high contact resistance. However, one of the disadvantages of the foregoing method is that the heating of the metal parts tends to take place over a broader area than is desired so that overheating of the metal parts away from the weld is apt to occur.

One known method for restricting the area to be heated is to have projections on one of the contacting faces and to weld the two metal parts together across the line of contact formed by the contacting projections. While this technique has been found very satisfactory in assuring uniform spot welding results when joining two pieces, it had the disadvantage that with three pieces, particular care and fixturing must be provided to locate circumferentially the projection on one otuside member with that of the other to be sure that they were opposite to form a short low resistance path for current. Because of the time and care necessary for circumferentially locating the parts together, this had the tendency of slowing down the rate at which the parts could be welded together and as well as to increase chances for misregister and resultant bad welds.

It would be desirable to provide a method of welding metal laminates using the projection welding technique without requiring indexing the parts together.

It is thus the object of the invention to provide a method for easily projection welding three layers of metal laminates together while maintaining substantially constant current path at each weld point.

Another object is to provide a method of assembling an antifriction bearing in a bearing mount by means of projection welding.

These and other objects will more clearly appear when taken in conjunction with the following disclosure and the accompanying drawing, wherein:

FIG. 1 depicts in end view three metal layers in contact with each other via projections on the middle layer;
FIG. 2 is a cross section of a bearing bracket as viewed in the direction 2—2 of FIG. 3;
FIG. 3 depicts in elevation one embodiment of a bearing bracket utilizing the concept of the invention;
FIG. 3A is a cross section taken along line 3A—3A of FIG. 3; and
FIG. 4 illustrates one type of bearing mount which may be produced in accordance with the invention.

In its broad aspect, the invention provides a method of forming a welded metal laminate comprising at least three metal layers formed of an intermediate layer between two outside layers wherein the intermediate layer is provided with a plurality of pairs of offset projections such that one projection of each pair is on one face of the intermediate layer and the other projection of the pair is on the other face of said layer but weldably offset to one side of said first projection, the offset during welding being embraced by a single molten weld bead.

The intermediate layer with the offset projections is placed between and in faying relationship with the two outside layers, with the projections contacting the two outside layers and the assembled layers then subjected to spot welding via a diagonal path formed by the contacting portions of the assembly.

The foregoing is illustrated by FIG. 1 which is an end view of three flat pieces of metals comprising intermediate layer 10 sandwiched between two outside layers 11 and 12. The intermediate layer 10 is shown with two pairs of oppositely disposed projections, each mate of the pair being offset relative to the other, comprising a first pair 13a, 13b and a second pair 14a, 14b. Referring to the first pair 13a, 13b, when spot welding electrodes E–1, E–2 are coaxially brought to bear against the outside layers, current flow is along a diagonal path 15 through contacting projections 13a and 13b. Since both projections are on the intermediate layer, the circumferential locating of the outside members is not necessary.

The contact between the layers is positive and restricted to a small area of contact as shown in FIG. 1, despite the fact that the electrodes themselves cover a greater area. Once the displaced or offset projections are formed on the intermediate layer, the path of flow of the electrical current is assured and the desirable current density can be predetermined from the known area of contact.

The invention as applied to the construction of a bearing mount is shown in FIGS. 2, 3, 3A and 4. Referring to FIGS. 2 and 3, a dished bearing mounting bracket 16 is shown having a peripheral flange 17 for mounting to the framework of an appliance relative to a motor via volt-mounting holes 18, the bracket having an annular offset 19 located radially inward of flange 17, the annular offset having an opening 20 centrally located therein, for receiving a bearing assembly (note FIG. 4).

In order to weld the bearing assembly to the bracket, the bracket is provided with pairs of offset projections, 21–21a, 22–22a, 23–23a and 24–24a, one of each pair being offset from the other but on the other face of the bracket. In cross section, the projections appear as shown in FIG. 3A.

As will be noted from FIG. 3, the projections there shown are offset relative to each other on the same circumference shown by dot and dash line 25. However, it will be apparent that they can be offset along a radius drawn from the center of the bracket and passing through a mating projection. Or, if desired, the offset of one projection can be in any direction from the other, so long as the effect illustrated schematically in FIG. 1 can be obtained.

Referring to FIG. 4, one embodiment of a bearing mount is shown produced in accordance with the invention. There a combined shock mount and antifriction ball bearing assembly is illustrated comprising a bearing-mounting bracket 25 of preferably pressed sheet metal having a peripheral mounting flange 26 in which bolt-receiving holes 27 are provided positioned, for example, 120° apart, said holes being adapted to receive a bolt 28 for mounting said bracket and its supported bearing to the framework of an appliance relative to the motor shaft. As will be noted, the bracket has located radially inward from the flange an annular offset 29 having an opening 30 centrally located therein. Supported within the opening is an antifriction bearing assembly designated generally by the numeral 31, said bearing assembly comprising an outer annular ring 32 spaced concentrically from an inner annular ring 33, said rings defining an annular space having supported therein less than a full complement of bearing balls 34 held in position by a cage 35, the ball riding in raceway 36 of the inner ring and complementary raceway 37 in the outer ring.

Encompassing the outer ring is a pair of annular flanged mounting caps 38, 39, each of which has bonded to the inner surface thereof an annular shock-absorbing grommet 40, 41 of elastomeric material such as buna N rubber, the grommet also extending radially along the vertical walls 42, 43 of the dished caps to provide a seal which extends to and wipingly contacts annular rabbets 44 and 45 of the inner ring. As will be apparent, the annular elastomeric grommet supportingly engages the peripheral surface of the outer bearing ring as well as engages the side faces of the ring so as to provide damping in all planes.

Each of the flanged caps has a peripheral lip 46 and 47 extending radially outward, each of which is attached to opposite faces of the annular offset at 48 by means of spot welding using the method of the invention, such that bearing assembly is supported substantially concentrically to the opening of the annular offset 29. By using offset projections as shown in FIGS. 2, 3 and 3A, mounting caps 38 and 39 can be easily projection welded to bearing-mounting bracket 25.

An important advantage of the invention is that only one member need be dimpled in a press operation. By having dimples on opposite sides of the member but slightly offset from each other within each pair, they are in effect self-locating since the welding path is fixed. A further advantage is that by having the offset distances the same for all of the pairs, the resistive path between projections will be substantially the same, whereby uniform weld quality is obtained.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for assemblying an antifriction bearing within a circular opening of a sheet metal annular bearing mounting bracket which comprises, providing a sheet metal bearing mounting bracket with a plurality of pairs of offset projections such that one projection of each pair is on one side face of the bracket and the other projection of said each pair is on the other side face of said bracket but weldably offset from said one projection, assembling an antifriction bearing into the opening of said bracket encompassed within two flanged caps each having a peripheral lip extending radially outward and disposed in faying relationship to opposite side faces of said bracket in contact with said projections, and then subjecting said bearing assembly to a welding current applied through the paths formed by each of said pairs of projections.

References Cited
UNITED STATES PATENTS

| 2,179,398 | 11/1939 | Briggs | 219—93 |
| 2,222,389 | 11/1940 | Zimmer | 219—93 |
| 2,315,357 | 3/1943 | Smith | 29—148 |
| 2,768,725 | 10/1956 | Foulds et al. | 29—148 |
| 3,108,839 | 10/1963 | Johnson | 29—148 |

JOSEPH V. TRUHE, Primary Examiner

L. H. BENDER, Assistant Examiner

U.S. Cl. X.R.

29—149.5